United States Patent
Bellis et al.

(10) Patent No.: US 10,503,908 B1
(45) Date of Patent: Dec. 10, 2019

(54) VULNERABILITY ASSESSMENT BASED ON MACHINE INFERENCE

(71) Applicant: Kenna Security, Inc., Chicago, IL (US)

(72) Inventors: Edward T. Bellis, Evanston, IL (US); Michael Roytman, Chicago, IL (US); David Bortz, Highland Park, IL (US); Jared Davis, Chicago, IL (US)

(73) Assignee: KENNA SECURITY, INC., Chicago, IL (US)

( * ) Notice: Subject to any disclaimer, the term of this patent is extended or adjusted under 35 U.S.C. 154(b) by 0 days.

(21) Appl. No.: 15/478,925

(22) Filed: Apr. 4, 2017

(51) Int. Cl.
*G06F 21/57* (2013.01)
*G06N 20/00* (2019.01)
*G06F 16/9032* (2019.01)
*G06F 16/903* (2019.01)

(52) U.S. Cl.
CPC ........ *G06F 21/577* (2013.01); *G06F 16/9032* (2019.01); *G06F 16/90335* (2019.01); *G06N 20/00* (2019.01); *G06F 2221/033* (2013.01)

(58) Field of Classification Search
CPC .................................................... G06F 21/577
See application file for complete search history.

(56) References Cited

U.S. PATENT DOCUMENTS

| | | | | |
|---|---|---|---|---|
| 6,505,184 B1 * | 1/2003 | Reed | ...................... | G06N 20/00 706/47 |
| 7,953,746 B1 * | 5/2011 | Garg | .................. | G06F 16/9032 707/762 |
| 8,538,946 B1 * | 9/2013 | Thakur | ............... | G06F 16/3329 707/706 |
| 9,270,695 B2 * | 2/2016 | Roytman | ............ | H04L 63/1433 |
| 2007/0136244 A1 * | 6/2007 | MacLaurin | ............ | G06Q 10/10 |
| 2008/0270120 A1 * | 10/2008 | Pestian | ............... | G06F 17/2785 704/9 |
| 2009/0144070 A1 * | 6/2009 | Psota | .................... | G06Q 10/083 705/330 |
| 2009/0198671 A1 * | 8/2009 | Zhang | .................. | G06F 16/3338 |
| 2009/0240638 A1 * | 9/2009 | Kirpal | ................. | G06F 16/9566 706/12 |
| 2011/0179477 A1 * | 7/2011 | Starnes | ................... | G06F 21/52 726/9 |
| 2012/0084076 A1 * | 4/2012 | Boguraev | ........... | G06F 17/2735 704/9 |

(Continued)

OTHER PUBLICATIONS

Information Extraction of Security Related Entities and Concepts from Unstructured Text (Lal) (Year: 2013).*

(Continued)

*Primary Examiner* — John B King
*Assistant Examiner* — Richard W Cruz-Franqui
(74) *Attorney, Agent, or Firm* — Hickman Palermo Becker Bingham LLP (57) ABSTRACT

Techniques related to vulnerability assessment based on machine inference are disclosed. A vulnerability assessment server may receive, from a client device, a set of metadata corresponding to a program stored on the client device. Further, the vulnerability assessment server may extract a program name from the set of metadata. Still further, the vulnerability assessment server may determine one or more vulnerabilities of the program based on searching for the program name in one or more storage systems that maintain sets of vulnerability data.

20 Claims, 4 Drawing Sheets

(56) References Cited

U.S. PATENT DOCUMENTS

| | | | | |
|---|---|---|---|---|
| 2012/0303663 | A1* | 11/2012 | Asikainen | G06F 16/3347 |
| | | | | 707/780 |
| 2013/0024929 | A1* | 1/2013 | Abraham | G06F 21/53 |
| | | | | 726/16 |
| 2013/0173639 | A1* | 7/2013 | Chandra | G06F 16/951 |
| | | | | 707/754 |
| 2016/0048770 | A1* | 2/2016 | Thomas | G06F 16/334 |
| | | | | 706/12 |
| 2016/0099963 | A1* | 4/2016 | Mahaffey | H04L 63/0227 |
| | | | | 726/25 |
| 2016/0110762 | A1* | 4/2016 | Mastierov | G06F 16/355 |
| | | | | 707/739 |
| 2016/0125061 | A1* | 5/2016 | Neiman | G06F 16/951 |
| | | | | 707/737 |
| 2016/0188882 | A1* | 6/2016 | Mahrous | G06F 21/577 |
| | | | | 726/25 |
| 2016/0260023 | A1* | 9/2016 | Miserendino, Jr. | G06N 20/00 |
| 2016/0378853 | A1* | 12/2016 | Mohammad | G06F 16/3344 |
| | | | | 707/706 |
| 2017/0031659 | A1* | 2/2017 | Burke | G06F 16/248 |
| 2017/0031904 | A1* | 2/2017 | Legrand | G06F 16/904 |
| 2017/0034023 | A1* | 2/2017 | Nickolov | H04L 43/0817 |
| 2017/0039483 | A1* | 2/2017 | Cheng | G06N 5/04 |
| 2017/0103215 | A1* | 4/2017 | Mahaffey | H04L 63/0227 |
| 2017/0124447 | A1* | 5/2017 | Chang | G06F 17/2765 |
| 2017/0154049 | A1* | 6/2017 | Catalano | G06F 16/958 |
| 2017/0236073 | A1* | 8/2017 | Borisyuk | G06Q 50/01 |
| | | | | 706/12 |
| 2017/0255700 | A1* | 9/2017 | Shiffman | G06F 16/951 |
| 2018/0052823 | A1* | 2/2018 | Scally | G06F 17/2785 |
| 2018/0159876 | A1* | 6/2018 | Park | G06F 16/9024 |
| 2018/0212904 | A1* | 7/2018 | Smullen | H04L 51/02 |
| 2018/0232443 | A1* | 8/2018 | Delgo | G06F 17/278 |
| 2019/0036887 | A1* | 1/2019 | Miller | G06F 21/60 |

OTHER PUBLICATIONS

Qualys, Inc., "The Next Generation Platform for End-toEnd Web Application Scanning", Web Application Scanning, https://www.qualys.com/suite/web-application-scanning/, viewed on May 30, 2017, 11pages.

Beiske, Konrad, Elastic, "Similarity in Elasticsearch", blog, https://www.elastic.co/blog/found-similarity-in-elasticsearch, last viewed on May 30, 2017, 7 pages.

* cited by examiner

FIGURE 4

VULNERABILITY ASSESSMENT BASED ON MACHINE INFERENCE

TECHNICAL FIELD

The present disclosure generally relates to security of computing devices. More specifically, the present disclosure relates to techniques for vulnerability assessment based on machine inference. SUGGESTED ART UNIT: 2430/2490.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

As used herein, a vulnerability is a weakness or flaw in computational logic found in software and some hardware components, such as firmware. When exploited, a vulnerability facilitates unauthorized access to a computing device, enables an attack to remain undetected, allows unauthorized modification of data, causes a reduction in the availability of data, and/or the like. For example, an attacker may exploit a vulnerability in a smartphone's operating system by sending, to the smartphone, a text message that includes a link for installing virtually undetectable spyware.

A vulnerability is typically detected based on scanning for particular programs that are stored on a computing device. Whether scanning is performed locally on a computing device or remotely via a network connection, scanning involves eliciting a response from software and/or hardware components of the computing device. The response is subsequently analyzed to determine whether it matches one or more pre-defined signature patterns of a known vulnerability.

However, scanning has the drawback of tying up computational and/or network resources. Not only does it involve a large amount of data processing, scanning also takes a long period of time to complete. For example, scanning may cause a computing device to execute multiple iterations of code that is varied ever so slightly for each iteration. Accordingly, scanning does not scale well to the enterprise level. For example, if scanning a single computing device takes several hours to complete, then scanning all computing devices of a large company may take days, weeks, or months to complete. And while a computing device is being scanned, it may exhibit diminished processing capabilities.

Furthermore, scanning leaves computing devices vulnerable to recently discovered attacks. As mentioned above, scanning involves eliciting a response that is subsequently matched to one or more pre-defined signature patterns of a known vulnerability. In other words, before scanning can be used to detect a known vulnerability, an analyst must write the one or more signature patterns for the known vulnerability. Thus, an attacker may exploit the delay between the time when a vulnerability becomes generally known to the public and the time when one or more signature patterns for the vulnerability are written.

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first" and "second" may be used to differentiate elements, but the modifiers do not necessarily indicate any particular order.

Embodiments are described herein according to the following outline:

1.0 Introduction
2.0 Structural and Functional Overview
  2.1 Client Device
  2.2 Vulnerability Assessment Server System
    2.2.1 Metadata Processing Logic
    2.2.2 Query Generation Logic
    2.2.3 Pattern Matching Logic
    2.2.4 Evaluation Logic
  2.3 Storage System(s)
3.0 Correlating Metadata to Vulnerability Data
  3.1 Indirect Correlation
  3.2 Direct Correlation
4.0 Process Overview
5.0 Hardware Overview
6.0 Extensions and Alternatives 1.0 Introduction Techniques related to vulnerability assessment based on machine inference are disclosed. A vulnerability assessment server receives, from a client device, a set of metadata for a program that is installed and/or stored on the client device. At a minimum, the set of metadata includes a program name. In some embodiments, the set of metadata further includes a vendor name, a version identifier, and/or the like. The vulnerability assessment server extracts at least the program name from the set of metadata.

Machine inference is used to determine one or more vulnerabilities of the program. The vulnerability assessment server may search for the program name in one or more storage systems. The one or more storage systems maintain sets of vulnerability data, such as Common Vulnerabilities and Exposures (CVE) data that can be referenced using a standardized program identifier, such as a Common Platform Enumeration (CPE) identifier.

In some embodiments, searching for the program name in the one or more storage systems involves a query generation process that is refined using machine learning. The generated query includes the program name. When the generated query is executed, at least the program name is compared to stored text based on performing a pattern-matching process.

The stored text may be vulnerability data, standardized program identifiers that are linked to corresponding vulnerability data, and/or the like. Query results are analyzed for false positives and/or false negatives, which are used as feedback to refine the query generation process.

Advantageously, the aforementioned techniques enable determination of program vulnerabilities, including zero-day vulnerabilities, without scanning for vulnerabilities at client devices. Furthermore, the aforementioned techniques enable determination of program vulnerabilities with greater accuracy than conventional approaches and with a reduced computational footprint at client devices.

2.0 Structural and Functional Overview

Figure 1:
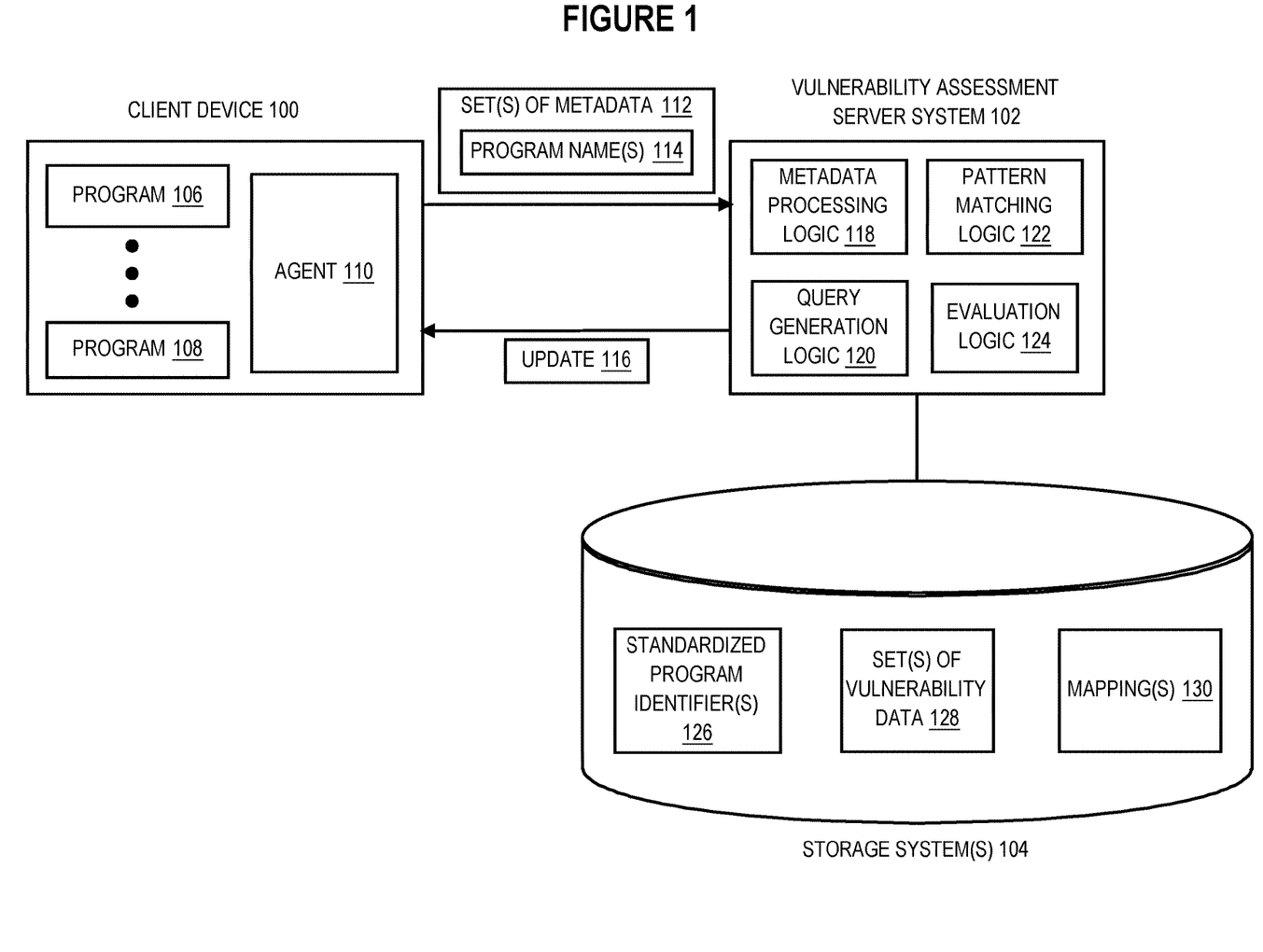
FIG. 1 is a block diagram that depicts an example computer architecture on which embodiments may be implemented.

FIG. 1 is a block diagram that depicts an example computer architecture on which embodiments may be implemented. Client device 100 is communicatively coupled to vulnerability assessment server system 102 via a network connection (not shown). In the example of FIG. 1, vulnerability assessment server system 102 is communicatively coupled to storage system(s) 104. However, in some embodiments, vulnerability assessment server system 102 may include all or part of storage system(s) 104. For example, mapping(s) 130 may be maintained in a local storage of vulnerability assessment server system 102.

Figure 4:
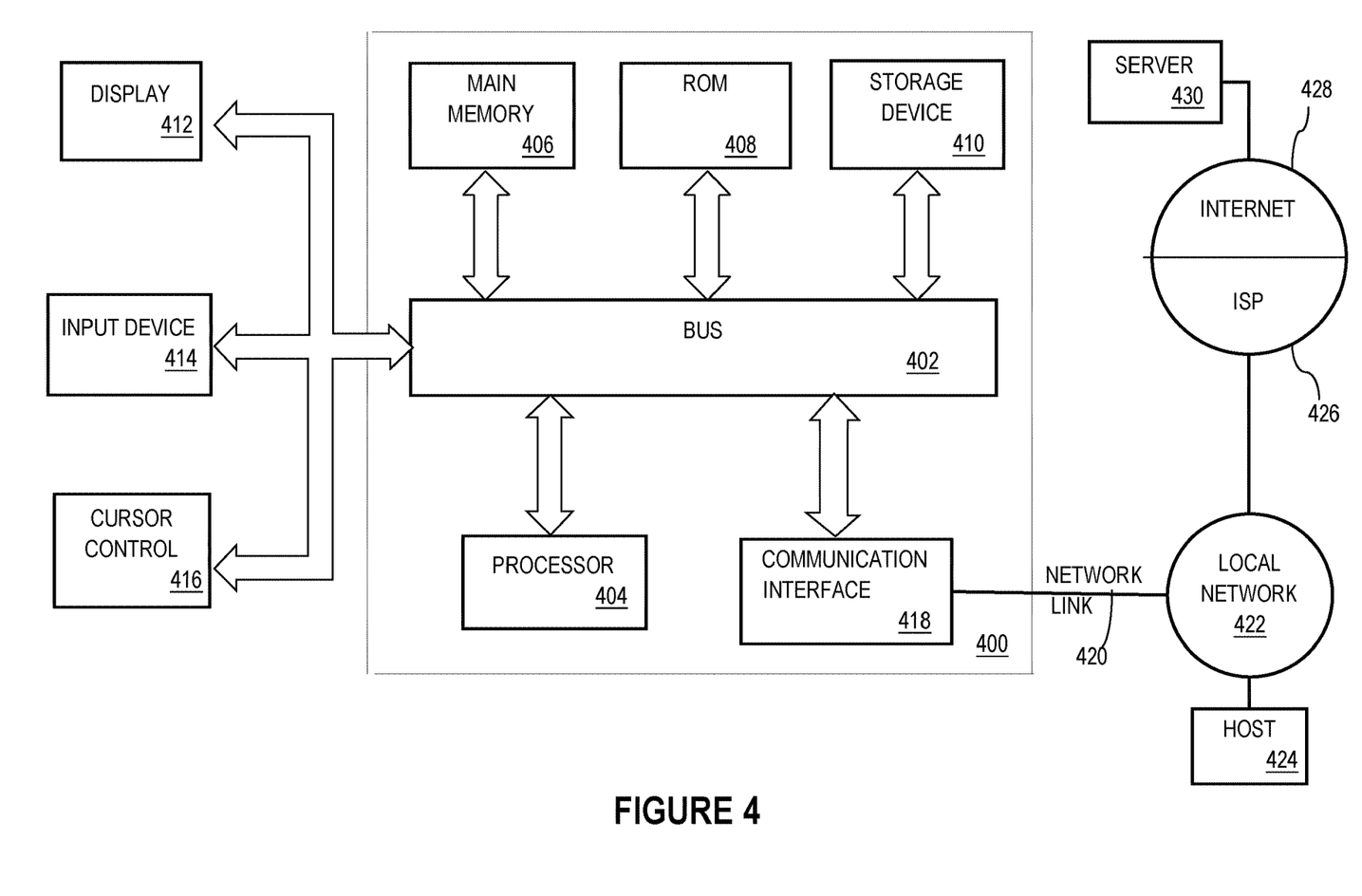
FIG. 4 is a block diagram that depicts a computer system on which embodiments may be implemented.

Each of the logical and/or functional units depicted in the figures or described herein may be implemented using any of the techniques further described herein in connection with FIG. 4. While the figures include lines that indicate various devices and/or logical units being communicatively coupled, each of the systems, computers, devices, storage, and logic may be communicatively coupled with each other.

As used herein, a "computer" may be one or more physical computers, virtual computers, and/or computing devices. For example, a computer may be a server computer; a cloud-based computer; a cloud-based cluster of computers; a virtual machine instance or virtual machine computing elements such as a virtual processor, storage, and memory; a data center, a storage device; a desktop computer; a laptop computer; a mobile device, and/or the like. A computer may be a client and/or a server. Any reference to "a computer" herein may mean one or more computers, unless expressly stated otherwise.

2.1 Client Device

Referring to FIG. 1, client device 100 includes programs 106-108 and agent 110. Client device 100 may be a computer or any other system that includes at least one processor and at least one memory. Programs 106-108 depict logic, code, and/or instructions stored on client device 100. For example, programs 106-108 may be firmware or software, such as an operating system, a device driver, an application, and/or the like that is installed on and/or executed by client device 100.

In some embodiments, different programs may correspond to different vendors. For example, program 106 may be the word processing application "WORD 2016" produced by the vendor "MICROSOFT", and program 108 may be the operating system "MAC OS X 10.10" produced by the vendor "APPLE". As used herein, a "vendor" is an entity that makes and distributes products that run on one or more computer hardware or operating system platforms.

Agent 110 depicts logic, code, and/or instructions configured to collect data about programs, such as programs 106-108, stored on client device 100. Non-limiting examples of agent 110 include the TANIUM endpoint security platform, the OSQUERY instrumentation framework, or the like. In some embodiments, agent 110 may be a third-party agent that corresponds to a vendor that differs from the vendor of a vulnerability assessment server running on vulnerability assessment server system 102 and any of the vendors of programs 106-108. In some embodiments, agent 110 may correspond to the vendor of a vulnerability assessment server running on vulnerability assessment server system 102 and/or at least one of the vendors of programs 106-108.

Agent 110 collects set(s) of metadata 112 respectively corresponding to programs 106-108. At a minimum, set(s) of metadata 112 respectively include program name(s) 114. In some embodiments, a set of metadata may also include a vendor name, a version identifier, and/or any other identifying information. For example, a set of metadata corresponding to program 106 may include the vendor name "MICROSOFT", the program name "WORD", and the version identifier "2016".

2.2 Vulnerability Assessment Server System

Vulnerability assessment server system 102 receives set(s) of metadata 112 from client device 100. Vulnerability assessment server system 102 may include one or more computers that run a vulnerability assessment server. In the example of FIG. 1, vulnerability assessment server system 102 includes metadata processing logic 118, query generation logic 120, pattern matching logic 122, and evaluation logic 124.

2.2.1 Metadata Processing Logic

In some embodiments, vulnerability assessment server system 102 may receive metadata collected by a variety of different agents. However, different agents may collect metadata in different formats. For example, vulnerability assessment server system 102 may receive metadata in a first format from a TANIUM endpoint agent running on a first client and may receive metadata in a second format from an OSQUERY instrumentation agent running on a second client. Thus, vulnerability assessment server system 102 may include metadata processing logic 118 to perform a normalization process on set(s) of metadata 112.

At a high level, the normalization process may be used to prepare set(s) of metadata 112 for use with query generation logic 120. More specifically, the normalization process may involve extracting, parsing, categorizing, serializing, and/or flattening textual elements included in set(s) of metadata 112. As used herein, textual elements may include letters, numbers, punctuation marks, and/or the like, such as any of the characters used in American Standard Code for Information Interchange (ASCII) encoding.

For example, set(s) of metadata 112 may be received as the comma-separated values (CSV) file provided below.
Name, Version
Microsoft Word, 2016
Mozilla Firefox, 43.0.1
Adobe Acrobat Reader DC, 15.020.20042
WORD is a word processing application produced by the vendor MICROSOFT, FIREFOX is a web browser produced by the vendor MOZILLA, and ACROBAT READER DC is document viewing software produced by the vendor ADOBE. The normalization process may be performed in part at storage system(s) 104, where values of "Name" may be deconstructed into vendor names and program names. Thus, the normalization process may involve comparing textual elements to lists of known vendors, programs, and/or version identifiers stored in storage system(s) 104. Metadata processing logic 118 may output the normalized metadata provided below.
Vendor Name, Program Name, Version
Microsoft, Word, 2016
Mozilla, Firefox, 43.0.1
Adobe, Acrobat Reader DC, 15.020.20042

In some embodiments, the normalized metadata is stored in storage system(s) 104.

2.2.2 Query Generation Logic

Query generation logic 120 may be a component of a vulnerability assessment server that formulates and/or selects a query for determining which of the data stored in storage system(s) 104 corresponds to a particular program. For example, query generation logic 120 may retrieve the normalized metadata from storage system(s) 104; extract the textual elements "Microsoft", "Word", and "2016" from the normalized metadata; tokenize the textual elements; and generate and/or select a query to search for stored data that includes the tokens "Microsoft", "Word", and "2016".

In some embodiments, queries are dynamically constructed based on feedback from evaluation logic 124. The feedback may indicate how to construct queries such that false positives and/or false negatives are minimized, such as by using particular query parameters and/or weighting query parameters in a particular manner. For example, the feedback may indicate that a query for the program MICROSOFT WORD 2016 should include multiple filters: a query parameter that searches for the tokens "Microsoft", "Word", and "2016" separately and with more weighting on "2016"; a query parameter that searches for the tokens "Microsoft" and "Word 2016" separately and with less weighting on "Microsoft"; and a query parameter that searches for the token "Microsoft Word 2016". Thus, query construction may be based on characteristics of data against which a query is to be executed.

In some embodiments, different queries may be constructed for different vendors, programs, and/or versions of programs. For example, vulnerability assessment server system 102 and/or storage system(s) 104 may maintain a cache of queries that are customized for particular programs. When query generation logic 120 reads in a set of metadata for a particular program, the cache may be checked for any queries that are customized for the particular program. If a query customized for the particular program is absent from the cache, query generation logic 120 may generate such a query. If a query customized for the particular program is present in the cache, query generation logic 120 may select the query.

In some embodiments, generating and/or selecting a query may involve invoking pattern matching logic 122. For example, query generation logic 120 may include sub-logics that each generate a different query based on defining or overriding various query parameters. Each sub-logic may be a method, function, and/or the like having a name that includes a vendor name, a program name, and/or a version identifier. Thus, pattern matching logic 122 may be invoked to compare a vendor name, a program name, and/or a version identifier in a set of metadata to a vendor name, a program name, and/or a version identifier in a sub-logic name. If pattern matching logic 122 determines a match, the sub-logic may be invoked to generate a query for a program corresponding to the set of metadata.

2.2.3 Pattern Matching Logic

Pattern matching logic 122 may be a component of a vulnerability assessment server that is invoked to perform a comparison of textual elements, such as those included in tokens and lexemes (hereinafter collectively referenced as "tokens"). For example, vulnerability assessment server may execute a query against data stored in storage system(s) 104 and may invoke pattern matching logic 122 to determine whether tokens included in the query match any tokens in storage system(s) 104. As used herein, a "match" condition may exist when textual elements are determined to be sufficiently similar. Thus, a pair of tokens may match even if they fail to match exactly.

In some embodiments, criteria for determining a "match" condition may vary according to an expected structure of data upon which pattern matching logic 122 is performed. For example, searching for a particular token in some structured data, such as a sub-logic name and/or a CPE identifier, may involve determining exact matches. However, searching for a particular token in some unstructured data, such as portions of CVE data, may involve computing similarity scores.

A similarity score may be computed to indicate a degree of similarity between tokens, and a "match" condition may be determined when a predetermined threshold is exceeded. For example, a similarity score may be based on a cosine distance between tokens. However, any of a variety of approaches for determining similarity between tokens may be used. For example, a similarity score may be based on a frequency with which a particular token appears in a text source, a proximity between particular tokens, how the proximity between the particular tokens is determined, characteristics of a text source in which a particular token appears, and/or the like.

In some embodiments, pattern matching logic 122 may compare textual elements stored in vectors. For example, vectorization may facilitate searching for a particular token in unstructured data based on a cosine-distance function that takes vectors as input. Vectorization is described in detail below.

2.2.4 Evaluation Logic

In some embodiments, vulnerability assessment server system 102 and/or storage system(s) 104 may maintain a cache of query results. To enable faster lookups, the cache may be a data structure that is partitioned according to vendor name, program name, and/or version identifier. Advantageously, the cache minimizes the computational overhead of executing pattern matching logic 122.

Evaluation logic 124 may be a component of a vulnerability assessment server that analyzes the accuracy of query results. For example, evaluation logic 124 may sort out false positives and/or false negatives based on comparing the query results to any of a variety of data with a known accuracy, such as the results of similar queries, the results of conventional scanning techniques, user feedback, and/or the like. The output of evaluation logic 124 may be provided to query generation logic 120 to improve query generation and/or selection.

In some embodiments, vulnerability assessment server system 102 may generate a vulnerability assessment report based on the query results. Additionally or alternatively, vulnerability assessment server system 102 may provide client device 100 with update 116. Update 116 may be a patch, a fix, and/or the like that prevents exploitation of a software and/or firmware vulnerability.

2.3 Storage System(s)

Storage system(s) 104 may be one or more repositories, datastores, data warehouses, data centers, disks, solid-state drives, and/or the like. Storage system(s) 104 may be comprised of volatile storage and/or non-volatile storage. Data stored on storage system(s) 104 may include databases, configuration files, data structures, and/or the like. In the example of FIG. 1, standardized program identifier(s) 126, set(s) of vulnerability data 128, and mapping(s) 130 are maintained on storage system(s) 104.

Vulnerability assessment server system 102 may collect structured and/or unstructured data from any number of sources. Collected data may be structured and/or restructured when stored in storage system(s) 104. For example, unstructured data may be converted into a structured format, such as a vector, that facilitates searches.

An example source is the National Vulnerability Database (NVD), which is a government repository of standards-based vulnerability management data. The NVD provides this data to the public to enable automation of vulnerability management, security measurement, and/or the like. Publicly accessible data stored in the NVD includes CPE identifiers and CVE data, which are examples of standardized program identifier(s) 126 and set(s) of vulnerability data 128, respectively. In the NVD, CPE identifiers are linked to one or more corresponding sets of CVE data.

For example, the CPE identifier "cpe:2.3:a:mozilla:firefox:43.0.1:*:*:*:*:*:*:*" has associated CPE data that includes the title information "Mozilla Firefox 43.0.1". The CPE identifier and/or the CPE data is linked to the CVE identifiers "CVE-2016-1947" and "CVE-2015-7575". Each CVE identifier has associated CVE data that includes a summary describing a vulnerability, a specification of affected programs, and/or a notice of the vulnerability from a vendor and/or a researcher. To illustrate, "CVE-2016-1947" corresponds to CVE data that includes the summary "Mozilla Firefox 43.x mishandles attempts to connect to the Application Reputation service, which makes it easier for remote attackers to trigger an unintended download by leveraging the absence of reputation data."

In some embodiments, storage system(s) 104 may maintain a faithful representation of all or part of the NVD. Referring to FIG. 1, standardized program identifier(s) 126 may include a faithful representation of the NVD CPE Dictionary that is optimized for performing pattern matching logic 122 on CPE identifiers and/or title information of CPE data. Additionally or alternatively, set(s) of vulnerability data 128 may include a faithful representation of the NVD CVE data feed that is optimized for performing pattern matching logic 122 on summary information of CVE data.

In some embodiments, storage system(s) 104 may maintain mapping(s) 130. Such mapping(s) may include one or more materialized views. For example, a "vulnerable_cpes" table may include a mapping between CVE data and CPE data and/or CPE identifiers that enables concurrent performance of pattern matching logic 122 on CVE data and CPE data. Additionally or alternatively, a "cpe_vulnerabilities" table may be an inverted version of a "vulnerable_cpes" table that provides optimized access to CVE data related to a particular CPE identifier.

In some embodiments, set(s) of vulnerability data 128 may include vendor advisories, researcher disclosures, bug reports, blog posts, and/or the like. Such data may be obtained based on crawling CVE data and/or the Web. For example, storage system(s) 104 may maintain, as a materialized view, a "vulnerable_ms_products" table that enables performing pattern matching logic 122 on Microsoft Security Bulletins and Knowledgebase articles.

In some embodiments, mapping(s) 130 may be stored, at least in part, in one or more caches. For example, mapping(s) 130 may include one or more caches of inferences made by vulnerability assessment server system 102. Thus, mapping(s) 130 may store correlations between set(s) of metadata 112 and standardized program identifier(s) 126, correlations between set(s) of metadata 112 and set(s) of vulnerability data 128, and/or the like. In some embodiments, the inferences may be stored in a tabular format and indexed according to relevance.

3.0 Correlating Metadata to Vulnerability Data

Instead of using pre-written vulnerability signatures, machine inference is used to correlate collected metadata to known vulnerabilities. Vulnerability assessment server system 102 may determine indirect and/or direct correlations between metadata and vulnerability data. The particular type of correlation that is determined may depend on the structure, if any, with which the vulnerability data is maintained in storage system(s) 104.

3.1 Indirect Correlation

Some collected metadata may correspond to programs for which CVE data can be accessed using CPE identifiers and/or CPE data. Thus, vulnerabilities may be determined for the programs based on determining whether vendor names, program names, and/or version identifiers in the metadata exactly match vendor names, program names, and/or version identifiers in CPE identifiers and/or title information of CPE data.

For example, the textual elements "Mozilla", "Firefox", and "43.0.1" may be extracted from collected metadata and normalized to the tokens "mozilla", "firefox", and "43.0.1", which are correlated to the categories "vendor name", "program name", and "version identifier", respectively. Pattern matching logic 122 may compare the tokens to the fourth, fifth, and sixth elements of a CPE identifier, which are known to correspond to the categories "vendor name", "program name", and "version identifier", respectively. If an exact match is determined for each of the tokens, the metadata may be correlated to the CPE identifier. Since the CPE identifier is known to correspond to the CVE identifiers "CVE-2016-1947" and "CVE-2015-7575", the metadata may also be correlated to "CVE-2016-1947" and "CVE-2015-7575" as well as their associated vulnerability data.

As another example, the textual elements "Mozilla", "Firefox", and "43.0.1" may be extracted from collected metadata and tokenized as "Mozilla", "Firefox", and "43.0.1". Title information of CPE data may also be tokenized as "Mozilla", "Firefox", and "43.0.1". Pattern matching logic 122 may compare the tokens, and if an exact match is determined for each of the tokens, then the metadata may be correlated to the CPE data. Since the CPE data is known to correspond to the CVE identifiers "CVE-2016-1947" and "CVE-2015-7575", the metadata may also be correlated to "CVE-2016-1947" and "CVE-2015-7575" as well as their associated vulnerability data.

3.2 Direct Correlation

Additionally or alternatively, pattern matching logic 122 may be performed on vulnerability data to determine whether the vulnerability data includes a particular vendor name, a particular program name, and/or a particular version identifier. To facilitate searches of vulnerability data, any unstructured portions of the vulnerability data may be stored in a structured format, such as a vector.

Figure 2:
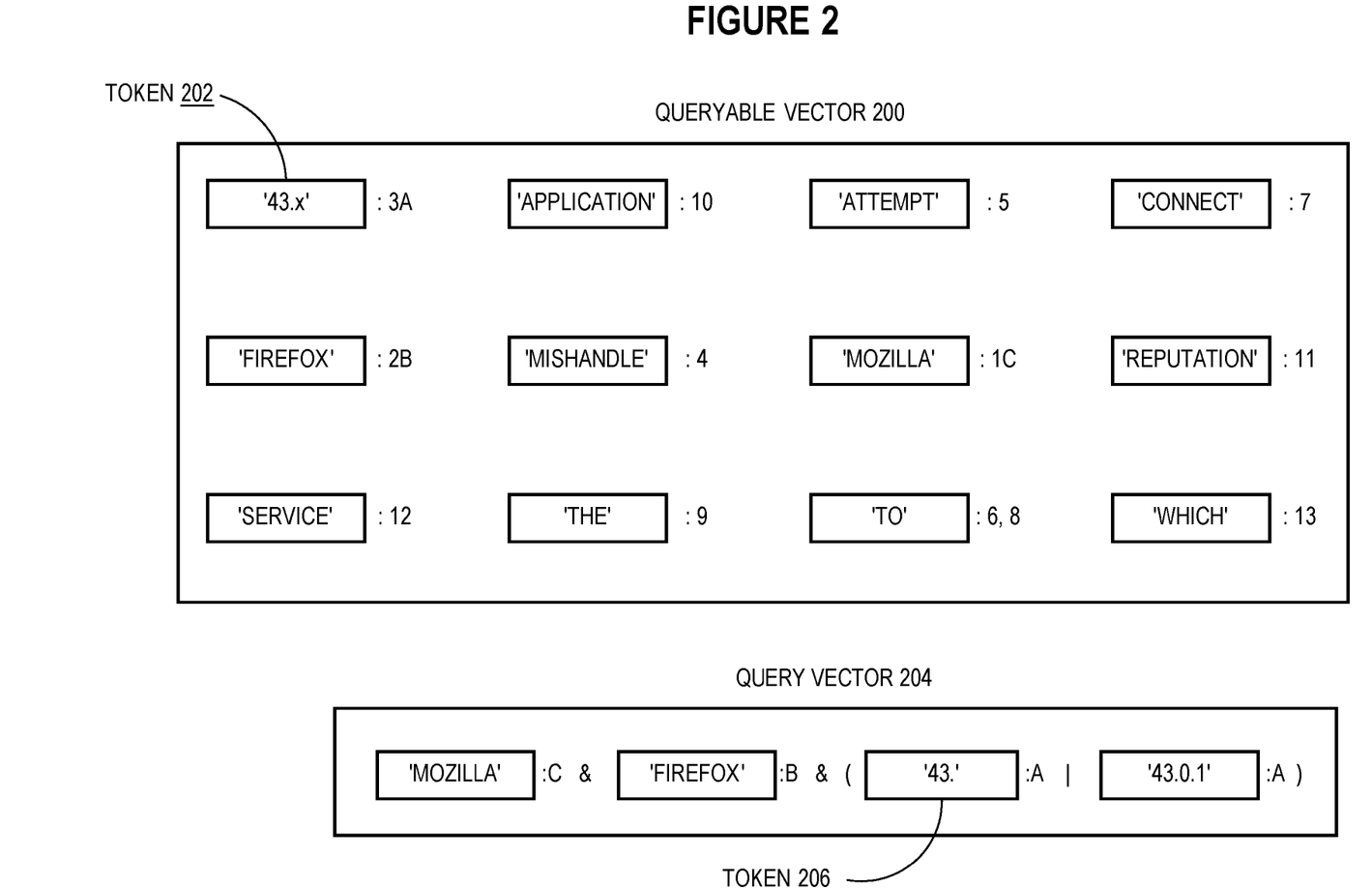
FIG. 2 is a block diagram that depicts example vectors.

FIG. 2 is a block diagram that depicts example vectors. Tokenized vulnerability data may be stored in queryable vector 200 as one or more tokens, such as token 202. For example, queryable vector 200 may be a POSTGRESQL tsvector that stores, as a set of one or more tokens, all or part of the associated vulnerability data for "CVE-2016-1947". For the avoidance of doubt, a tsvector of the POSTGRESQL database management system is a non-limiting example of a vector, and the particular implementation of the vector is not critical. For example, similar query execution may be accomplished via the ELASTICSEARCH search engine or some other search engine. Queryable vector 200 may be stored in a POSTGRESQL column with a foreign key that references "CVE-2016-1947" and/or "cpe:2.3:a:mozilla:firefox:43.0.1:*:*:*:*:*:*:*" in another table stored in storage system(s) 104. In some embodiments, the set of one or more tokens may be sorted and/or weighted.

Query generation logic 120 may construct query vector 204 to include a vendor name, a program name, and/or a version identifier as one or more tokens, such as token 206. For example, query vector 204 may be a POSTGRESQL tsquery. In some embodiments, query vector 204 varies on a per-vendor basis. For example, query vectors for different vendors may store different tokens, query parameters, and/or weightings.

One or more distance calculations may be performed between query vector 204 and one or more queryable vectors. In some embodiments, the one or more distance calculations may include a Levenshtein distance. For example, token 206 is not an exact match with token 202. However, token 202 may be determined to be sufficiently similar to token 206. In some embodiments, pattern matching logic 122 may be refined via supervised machine learning to include an interpretive aspect. For example, the proximity of the tokens "before" and "44.x" may indicate sufficient similarity with the token "43.0.1". This may be achieved based on adjusting a threshold distance score that establishes a minimum distance score needed to avoid classification as a false positive.

In some embodiments, searches may be optimized based on indexing vectors. For example, an inverted index may be generated to store postings that include mappings between tokens and locations and/or frequency counts. To enable faster searches, indexes may be searched before vulnerability data is searched.

In some embodiments, searches may be further optimized based on denormalizing data into materialized views. For example, the token "mozilla" may be denormalized and indexed as the token "Mozilla". Thus, data may effectively be copied and reindexed for fast lookup without modifying source tables.

4.0 Process Overview

Figure 3:
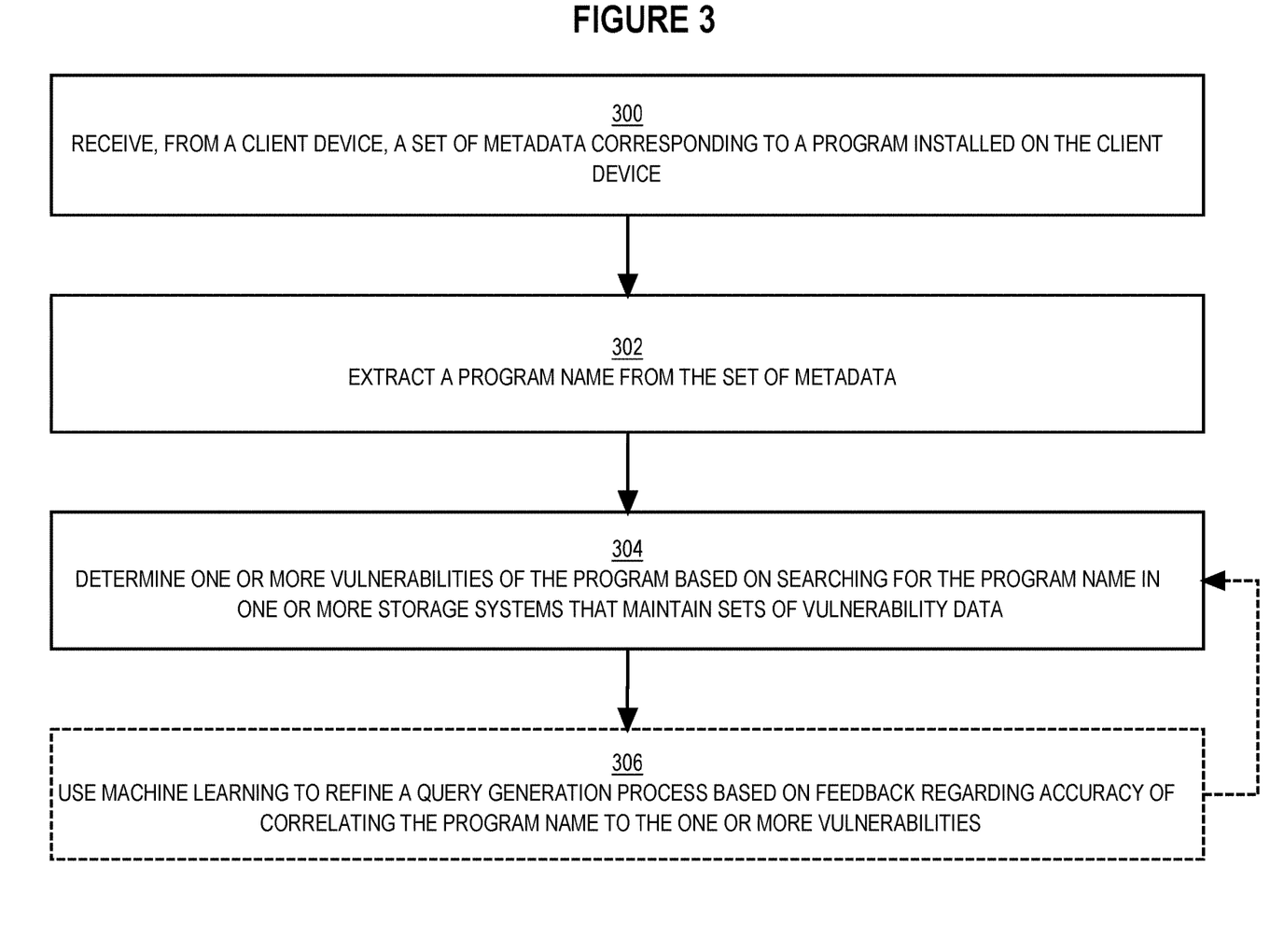
FIG. 3 is a flow diagram that depicts an approach for vulnerability assessment based on machine inference.

FIG. 3 is a flow diagram that depicts an approach for vulnerability assessment based on machine inference. Blocks 300-306 may be performed by one or more logical units of a vulnerability assessment server.

At block 300, the vulnerability assessment server receives a set of metadata from a client device. The set of metadata corresponds to a program installed on the client device. In some embodiments, the set of metadata is received from a third-party agent that executes on the client device to collect sets of metadata corresponding to a plurality of programs stored on the client device.

At block 302, the vulnerability assessment server extracts a program name from the set of metadata. In some embodiments, the vulnerability assessment server further extracts a vendor name and/or a version identifier from the set of metadata.

At block 304, the vulnerability assessment server determines one or more vulnerabilities of the program. This determination may be based on searching for at least the program name in one or more storage systems that maintain sets of vulnerability data.

In some embodiments, the vulnerability assessment server searches the one or more storage systems for a standardized program identifier that includes the program name. The one or more storage systems may maintain a mapping between the program name and the standardized program identifier. Based on determining a standardized program identifier for the program, the vulnerability assessment server correlates the standardized program identifier to a set of vulnerability data that corresponds to the one or more vulnerabilities of the program.

In some embodiments, the vulnerability assessment server searches the one or more storage systems for a set of vulnerability data that includes the program name. The one or more storage systems may maintain a mapping between the program name and the set of vulnerability data that includes the program name.

In some embodiments, the vulnerability assessment server stores, in a first vector a first set of one or more tokens corresponding to text to be searched. Furthermore, the vulnerability assessment server determines a second set of one or more tokens to be stored in a second vector. The second set of one or more tokens may include at least the program name. Still further, the vulnerability assessment server compares the first vector to the second vector to determine whether the text corresponds to the program. The text may be determined to correspond to the program based on computing a distance between the first vector and the second vector.

At optional block 306, the vulnerability assessment server may use supervised machine learning to refine a query generation process that determines a third set of one or more tokens to be stored in a third vector. For example, the third vector may be a modified version of query vector 204 that includes the tokens "before" and "43.0.2" and that specifies the tokens should be adjacent to each other. Additionally or alternatively, the modified version of query vector 204 may weight tokens differently. The query generation process may be refined based on feedback regarding accuracy of correlating the program name to the one or more vulnerabilities. For example, evaluation logic 124 may have determined that query vector 204 failed to match "CVE-2015-7575". As a result, the query generation process may be refined to generate the aforementioned modified version of query vector 204, which may then be used to search storage system(s) 104. Thus, block 306 may proceed to block 304.

Additionally or alternatively, the vulnerability assessment server may provide the client device with an update that prevents exploitation of the one or more vulnerabilities. The update may be stored in storage system(s) 104 and in association with a particular vulnerability identified in set(s) of vulnerability data 128.

5.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the disclosure may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

6.0 Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A vulnerability assessment method comprising:
receiving, from a client device, at a vulnerability assessment server, a set of metadata corresponding to a program stored on the client device;
extracting, at the vulnerability assessment server, at least a program name and a vendor name from the set of metadata corresponding to the program;
performing a search, in one or more storage systems that maintain sets of unstructured vulnerability data, for a set of unstructured vulnerability data corresponding to the program, wherein performing the search comprises:
determining a set of query tokens that includes the program name;
modifying, based on machine learning, the set of query tokens;
generating a query that includes the modified set of query tokens;
executing the query to identify the set of unstructured vulnerability data corresponding to the program;
searching the one or more storage systems for a standardized program identifier that includes the program name;
correlating the standardized program identifier to the set of unstructured vulnerability data corresponding to the program;
identifying, at the vulnerability assessment server, one or more vulnerabilities of the program based on the set of unstructured vulnerability data corresponding to the program,
wherein the method is performed by one or more computing devices.

2. The vulnerability assessment method of claim 1, further comprising:
providing the client device with an update that prevents exploitation of the one or more vulnerabilities.

3. The vulnerability assessment method of claim 1, wherein the set of metadata is received from a third-party agent that executes on the client device to collect sets of metadata corresponding to a plurality of programs stored on the client device.

4. The vulnerability assessment method of claim 1, wherein the one or more storage systems maintains a mapping between the program name and the standardized program identifier.

5. The vulnerability assessment method of claim 1, wherein the set of unstructured vulnerability data corresponding to the program includes a token corresponding to the program name.

6. The vulnerability assessment method of claim 5, wherein the one or more storage systems maintains a mapping between the program name and the set of unstructured vulnerability data corresponding to the program.

7. The vulnerability assessment method of claim 1, wherein executing the query comprises comparing the set of query tokens to tokens of the sets of unstructured vulnerability data by:
storing the tokens of the sets of unstructured vulnerability data in a set of vectors;
storing the set of query tokens in a query vector;
comparing the query vector to a vector of the set of vectors to determine whether the vector corresponds to the program.

8. The vulnerability assessment method of claim 7, wherein the vector is determined to correspond to the program based on computing a distance between the vector and the query vector.

9. A vulnerability assessment server system comprising:
one or more processors; and
one or more non-transitory storage media storing instructions which, when executed by the one or more processors, cause:
receiving, at a vulnerability assessment server from a client device, a set of metadata corresponding to a program stored on the client device;
extracting, at the vulnerability assessment server, at least a program name and a vendor name from the set of metadata corresponding to the program;
determining, at the vulnerability assessment server, one or more vulnerabilities of the program based on searching, in one or more storage systems that maintain sets of unstructured vulnerability data, for a set of unstructured vulnerability data corresponding to the program, wherein searching comprises:
determining a set of query tokens that includes the program name;
modifying, based on machine learning, the set of query tokens;
generating a query that includes the modified set of query tokens;
executing the query to identify the set of unstructured vulnerability data corresponding to the program;
searching the one or more storage systems for a standardized program identifier that includes the program name;
correlating the standardized program identifier to the set of unstructured vulnerability data corresponding to the program.

10. The vulnerability assessment server system of claim 9, wherein the instructions, when executed by the one or more processors, further cause:
providing the client device with an update that prevents exploitation of the one or more vulnerabilities.

11. The vulnerability assessment server system of claim 9, wherein the set of metadata is received from a third-party agent that executes on the client device to collect sets of metadata corresponding to a plurality of programs stored on the client device.

12. The vulnerability assessment server system of claim 9, wherein the one or more storage systems maintains a mapping between the program name and the standardized program identifier.

13. The vulnerability assessment server system of claim 9, wherein the set of unstructured vulnerability data corresponding to the program includes a token corresponding to the program name.

14. The vulnerability assessment server system of claim 13, wherein the one or more storage systems maintains a mapping between the program name and the set of unstructured vulnerability data corresponding to the program.

15. The vulnerability assessment server system of claim 9, wherein executing the query comprises comparing the set of query tokens to tokens of the sets of unstructured vulnerability data by:
storing the tokens of the sets of unstructured vulnerability data in a set of vectors;

storing the set of query tokens in a query vector;

comparing the query vector to a vector of the set of vectors to determine whether the vector corresponds to the program.

16. The vulnerability assessment server system of claim 15, wherein the vector is determined to correspond to the program based on computing a distance between the vector and the query vector.

17. The vulnerability assessment method of claim 1, wherein the set of query tokens are a set of weighted tokens, and wherein machine learning is used to determine a weighting for a query token in the set of query tokens.

18. The vulnerability assessment server system of claim 9, wherein the set of query tokens are a set of weighted tokens, and wherein machine learning is used to determine a weighting for a query token in the set of query tokens.

19. The vulnerability assessment method of claim 1, wherein the sets of unstructured vulnerability data include one or more tokens that are not included in the set of query tokens.

20. The vulnerability assessment server system of claim 9, wherein the sets of unstructured vulnerability data include one or more tokens that are not included in the set of query tokens.

* * * * *